US009247089B2

(12) United States Patent
Ku

(10) Patent No.: US 9,247,089 B2
(45) Date of Patent: Jan. 26, 2016

(54) SCANNING APPARATUS

(71) Applicant: AVISION INC., Hsinchu (TW)

(72) Inventor: Jeau-Jeau Ku, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/205,376

(22) Filed: Mar. 12, 2014

(65) Prior Publication Data
US 2015/0201097 A1 Jul. 16, 2015

(30) Foreign Application Priority Data

Jan. 14, 2014 (TW) .............................. 103101325 A

(51) Int. Cl.
H04N 1/04 (2006.01)
H04N 1/00 (2006.01)
H04N 1/10 (2006.01)

(52) U.S. Cl.
CPC ....... *H04N 1/00726* (2013.01); *H04N 1/00782* (2013.01); *H04N 1/10* (2013.01); *H04N 2201/0416* (2013.01); *H04N 2201/0434* (2013.01)

(58) Field of Classification Search
CPC . H04N 1/10; H04N 1/00726; H04N 1/00782; H04N 2201/0416; H04N 2201/0434

USPC .......................... 358/474, 475, 498, 497, 1.18
See application file for complete search history.

(56) References Cited

U.S. PATENT DOCUMENTS

| | | | |
|---|---|---|---|
| 6,624,910 B1 * | 9/2003 | Koh et al. ..................... 358/1.18 |
| 2007/0019253 A1 * | 1/2007 | Huang .......................... 358/474 |
| 2007/0109609 A1 * | 5/2007 | Guo ............................. 358/474 |
| 2010/0157381 A1 * | 6/2010 | Chen ............................ 358/449 |
| 2011/0058231 A1 * | 3/2011 | Oshima .............. H04N 1/00204 358/474 |
| 2013/0021633 A1 * | 1/2013 | Atsumi ................ G03G 15/502 358/1.13 |

* cited by examiner

Primary Examiner — Houshang Safaipour

(57) ABSTRACT

A scanning apparatus for scanning an object includes a casing, a scanning module, at least one sensor, and a control unit. The control unit is electrically connected to the scanning module and the sensor for receiving a detecting signal generated by the sensor so as to actuate the scanning module to scan, and the scanning module then generates a first image of a first scanned page and a second image of a second scanned page. The control unit further includes a recognition unit for recognizing whether the first image along with the second image are continuous. As the recognition unit recognizes the first image and the second image to be discontinuous, the control unit generates an insertion image between the first image and the second image.

9 Claims, 6 Drawing Sheets

SCANNING APPARATUS

BACKGROUND OF THE INVENTION

1. Field of the Invention

The present invention relates to a scanning apparatus, and more particularly, to a scanning apparatus for scanning a binding document.

2. Description of the Prior Art

With the growth of scanning technology, scanners are becoming widespread and applied at home or office. A scanner is capable of capturing objects and is utilized in scanning documents, photos, and books. The captured digital image data can be displayed and stored in a computer, so that the image data can be permanently stored and the space that the objects occupied may be saved; meanwhile, the image data can also be edited or delivered by the user for a variety of applications of the image data.

Scanners can be classified into flatbed scanners and sheet-fed scanners according to different operation. The sheet-fed scanner is capable of automatically feeding sheets and is generally used for scanning a large amount of sheets. The flatbed scanner is particularly used for scanning binding documents or books. It is impractical to scan the binding documents or a book by the sheet-fed scanner without detaching the sheets from the binding. However, the binding documents or books can properly be scanned by use of the flatbed scanner. When a book is opened and placed on a scanning flatbed, the spine of the book makes it difficult to fully lay flat on the scanning flatbed, causing unsatisfactory scanning result like lack of clarity or shadows on the images. Hence, a flatbed scanner with an inclined surface can properly place the spine and the pages of the book can be laid flat on the flatbed such that a clear image may be obtained. However, the book to be scanned has odd pages and even pages, these scanners with one inclined surface can only scan one page at a time and need a 180 degrees rotation of the book after finishing scanning an odd page before the even page can be scanned. Also when scanning discontinuous pages, such as merely even pages or merely odd pages, the conventional scanner is incapable of recognizing that these pages are discontinuous. Therefore, it is an important issue to design a scanner capable of recognizing the discontinuous pages and automatically carrying out appropriate procedures so that the discontinuous pages may be distinguished for conveniently previewing, reading, and printing.

SUMMARY OF THE INVENTION

The present invention is to provide a scanning apparatus, and more specifically, to a scanning apparatus for scanning a binding document so as to solve the above drawback.

According to the disclosure, the scanning apparatus is for scanning an object. The scanning apparatus includes a casing, a scanning module, at least one sensor, and a control unit. The casing includes a first flatbed and a second flatbed. The first flatbed is for placing the object and includes a scanning area, and the second flatbed is adjacent to the first flatbed. The scanning module is disposed on the casing and under the first flatbed for capturing the object on the scanning area so as to generate a first image from a first scanned page and a second image from a second scanned page. The sensor is disposed in the casing for sensing the object so as to send a detection signal. The control unit is electrically connected to the scanning module and the sensor for actuating the scanning module to scan and generate the first image and the second image when the control unit receives the detection signal. The control unit further includes a recognition unit for recognizing whether the first image along with the second image are continuous. As the first image and the second image are recognized by the recognition unit to be discontinuous, the control unit generates an insertion image between the first image and the second image.

The control unit determines whether the scanning apparatus enters a book scanning mode according to the detection signal sent by the sensor when scanning the object. The recognition unit recognizes whether the images scanned under the book scanning mode are continuous. The control unit inserts a blank image automatically when the scanned images are discontinuous. In addition, all pages of a finished document are aligned in orientation, and the left-and-right positions of pages of the finished document are not confused by the blank image for conveniently reading. The drawback caused by the discontinuous pages during scanning can be solved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
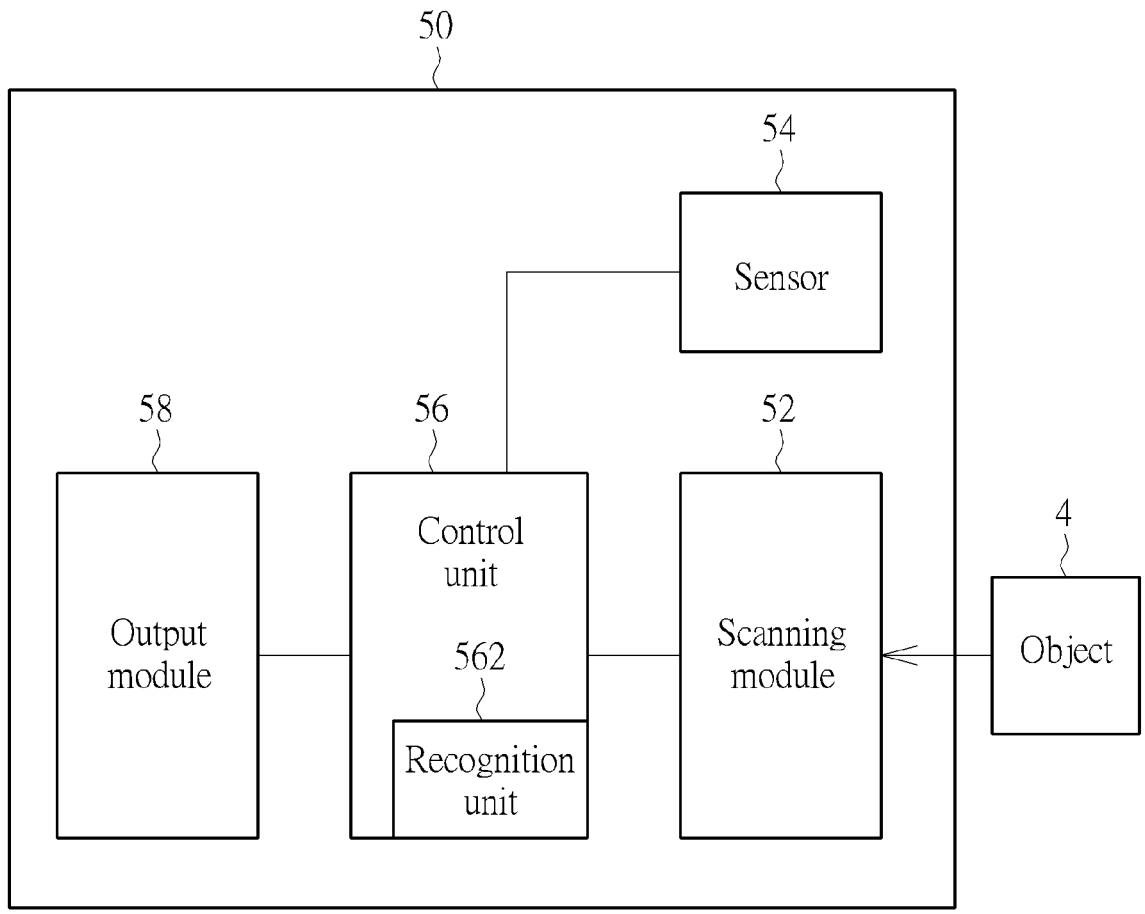
FIG. 1 is a functional block diagram of a scanning apparatus according to an embodiment of the present invention.
Figure 2:
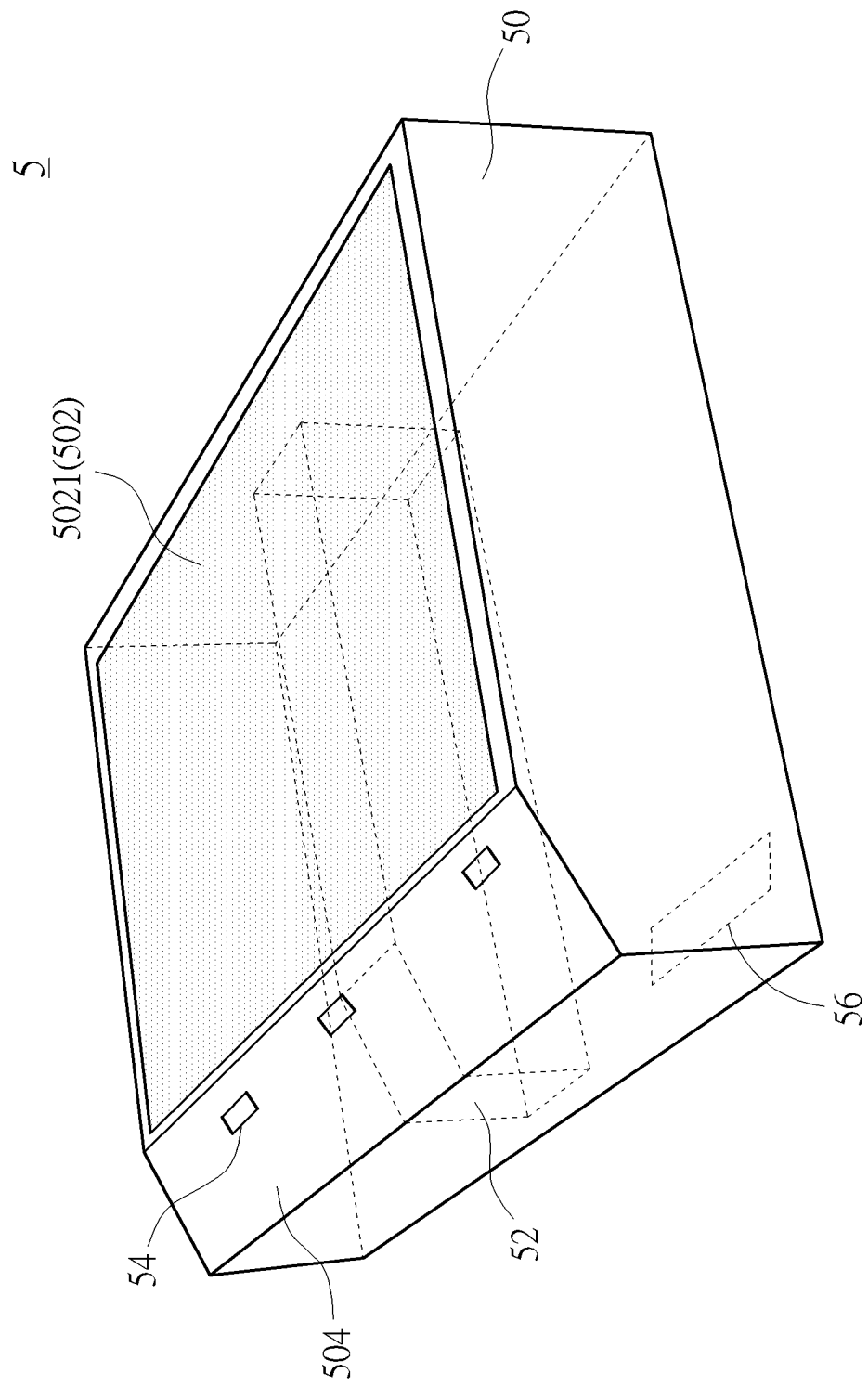
FIG. 2 is a schematic diagram of the scanning apparatus according to the embodiment of the present invention.

Please refer to FIG. 1 and FIG. 2. FIG. 1 is a functional block diagram of a scanning apparatus 5 according to an embodiment of the present invention. FIG. 2 is a schematic diagram of the scanning apparatus 5 according to the embodiment of the present invention. The scanning apparatus 5 is for scanning an object 4. The scanning apparatus 5 includes a casing 50, a scanning module 52, at least one sensor 54, and a control unit 56. The casing 50 includes a first flatbed 502 and a second flatbed 504. The first flatbed 502 is for placing the object 4 and includes a scanning area 5021, and the second flatbed 504 is adjacent to the first flatbed 502. The scanning module 52 is disposed in the casing 50 and under the first flatbed 502 for capturing the object 4 on the scanning area 5021. The at least one sensor 54, either one or more, is disposed in the casing 50 for sensing the object 4 so as to send a detection signal. Three sensors 54 are used in the embodiment of FIG. 2, but not limited to this.

The control unit 56 is electrically connected to the scanning module 52 and the sensor 54 for actuating the scanning module 52 to scan when receiving the detection signal. Additionally, the control unit 56 receives and processes the image captured by the scanning module 52. The control unit 56 can be disposed either in the casing 50, or out of the casing 50 like a central processing unit (CPU) disposed in a personal computer and electrically connected to the scanning module 52 and the sensor 54 so as to control the scanning module 52 and the sensor 54. According to other embodiments, the scanning module 52 can be actuated by a computer or by a button (not shown in the figures) on the scanning apparatus 5. The control unit 56 further includes a recognition unit 562. The scanning apparatus 5 further includes an output module 58 for outputting images processed by the control unit 56. The output module 58 can be disposed on the casing 50. It can also be an external computer or a printer.

Figure 3:
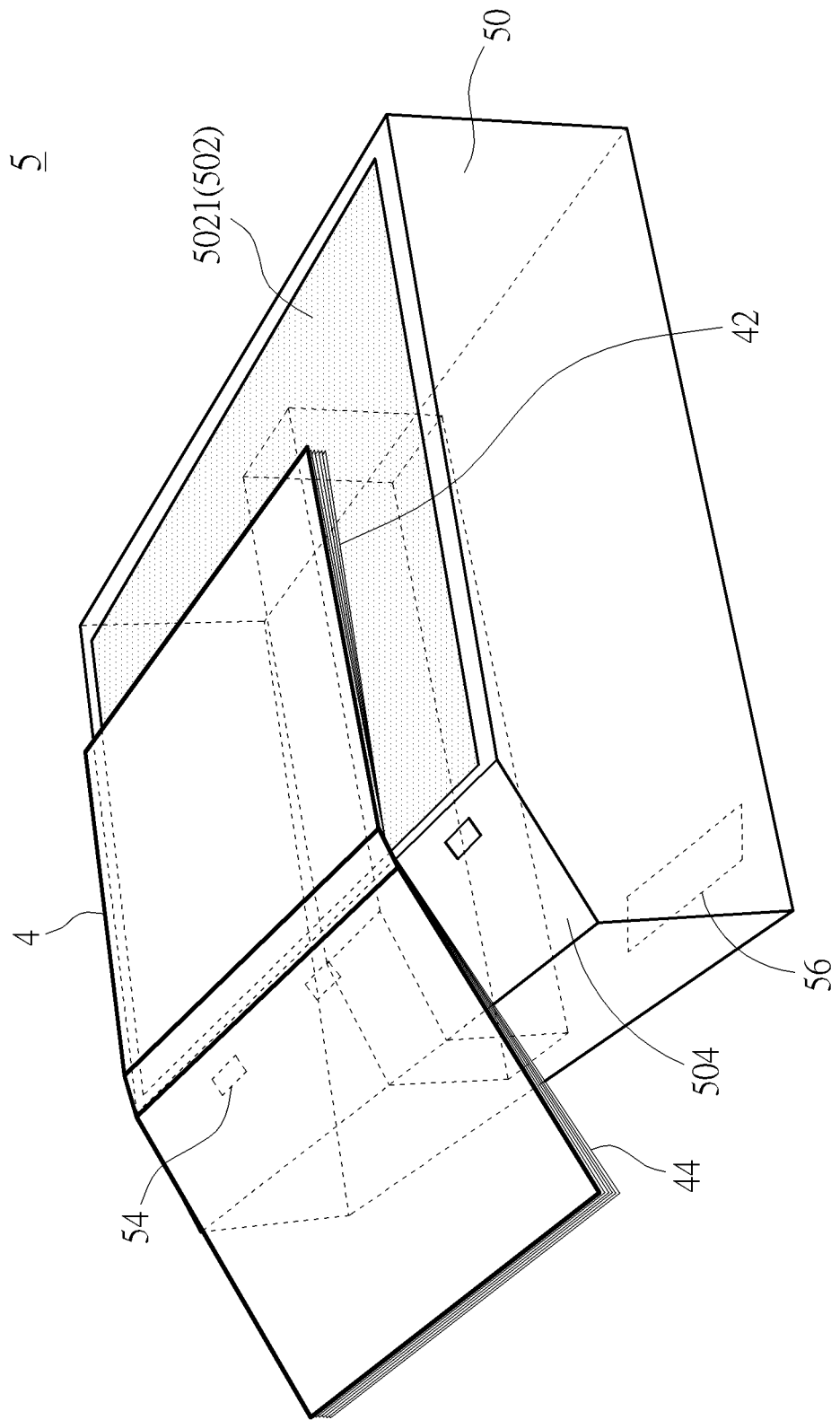
FIG. 3 is a diagram of the scanning apparatus scanning an object according to the embodiment of the present invention.

Please refer to FIG. 3. FIG. 3 is a diagram of the scanning apparatus 5 scanning an object 4 according to the embodiment of the present invention. The object 4 includes a ready page 42 and an unready page 44. In the present invention, object 4 is a binding document, such as a book, includes a plurality of pages. The ready page 42 is placed on the first flatbed 502 facing down to the scanning area 5021 of the first flatbed 502. The unready page 44 is placed on the second flatbed 504. Being as the form of a book, when the object 4 is to be scanned with the ready page 42 placed on the first flatbed 502, the unready page 44 that is connected to the ready page 42 will be placed on the second flatbed and will trigger the sensor 54 on the second flatbed 504 to send the detection signal to the control unit 56, and the control unit 56 controls the scanning apparatus 5 to enter a book scanning mode accordingly. According to the embodiment, the sensor 54 is disposed at a position of the second flatbed 504 close to the first flatbed 502, but not limited to this. The sensor 54 can be disposed on the first flatbed 502 and can be triggered by the ready page 42 of the object 4 according to another embodiment. Practically, the sensor 54 may be a mechanical sensor, an optical sensor, or an infrared ray sensor so that the object 4 may trigger the sensor 54 by way of pressing or covering the sensor 54. Furthermore, the first flatbed 502 and the second flatbed 504 may be structured in a way that an angle exists therebetween, which ranges from 90 to 180 degrees, so as to be able to properly place the object 4 thereon, providing that the object 4, particularly a portion close to the binding of the object 4, can stay as close as possible to the scanning area 5021 for quality scanning.

Figure 4:
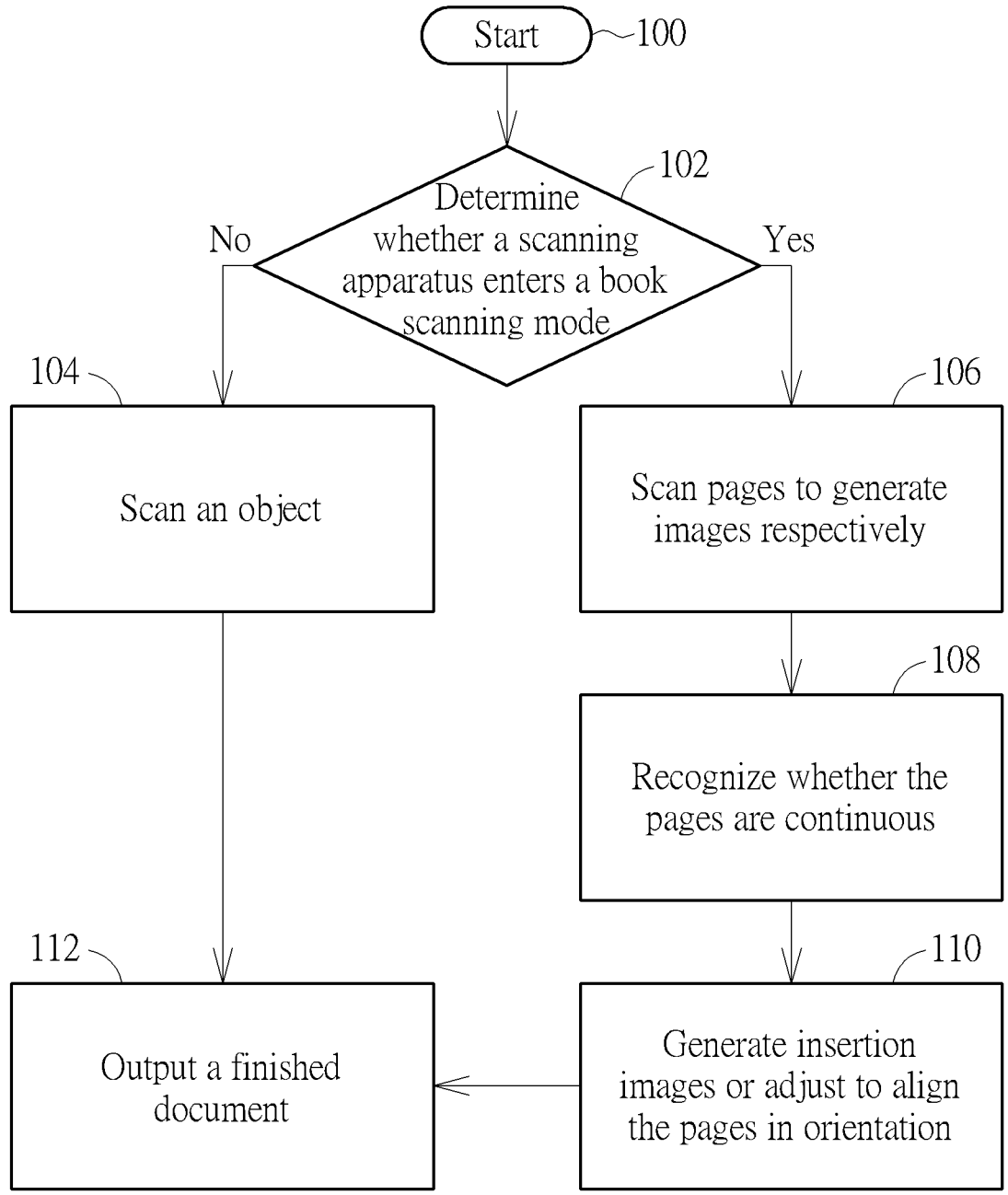
FIG. 4 is a flow chart of a scanning process carried out by the scanning apparatus according to the embodiment of the present invention.

Please refer to FIG. 4. FIG. 4 is a flow chart of a scanning process carried out by the scanning apparatus 5 according to the embodiment of the present invention. The scanning process includes the following steps:

Step 100: Actuating the scanning apparatus;

Step 102: The control unit determining whether the scanning apparatus enters the book scanning mode;

Step 104: Scanning the object placed on the scanning area of the first flatbed;

Step 106: Scanning a first scanned page and a second scanned page in sequence and generating a first image and a second image respectively;

Step 108: Utilizing a recognition unit to recognize whether the first image along with the second image are continuous according to orientation or page numbers of the first image and the second image;

Step 110: The control unit generating an insertion image between the first image and the second image according to the recognition results of the recognition unit, and the control unit further adjusting the first image or the second image so as to align the first image in orientation with the second image;

Step 112: The output module outputting a finished document.

The description of the above steps is detailed as follows. Please refer to FIG. 2 to FIG. 4. In step 100, the scanning apparatus 5 is first actuated. When operating the scanning apparatus 5, the ready page 42 of the object 4 is placed on the scanning area 5021 of the first flatbed 502, and the unready page 44 will be placed on the second flatbed 504, as shown in FIG. 3.

In step 102, the control unit 56 determines whether the scanning apparatus 5 enters the book scanning mode. According to the embodiment, as the sensor 54 detects the existence of the unready page 44 of the object 4, it is triggered to send the detection signal to the control unit 56. Once receiving the detection signal, the control unit 56 determines the object 4 on the first flatbed 502 to be a book. The control unit 56 then controls the scanning apparatus 5 to enter the book scanning mode and execute step 106. If the sensor 54 is not triggered, that is, the object 4 is not regarded as a book, which does not include the unready page 44 on the second flatbed 504, the scanning apparatus 5 will enter a standard scanning mode and scan the object 4 placed on the scanning area 5021 of the first flatbed 502 immediately by executing step 104. According to another embodiment above-mentioned, the sensor 54 is disposed on the first flatbed 502 and is triggered by the ready page 42 of the object 4 directly, and it is providable for the scanning apparatus 5 to enter the book scanning mode by utilizing a computer or actuating a mode controlling button on the scanning apparatus 5.

Figure 5:
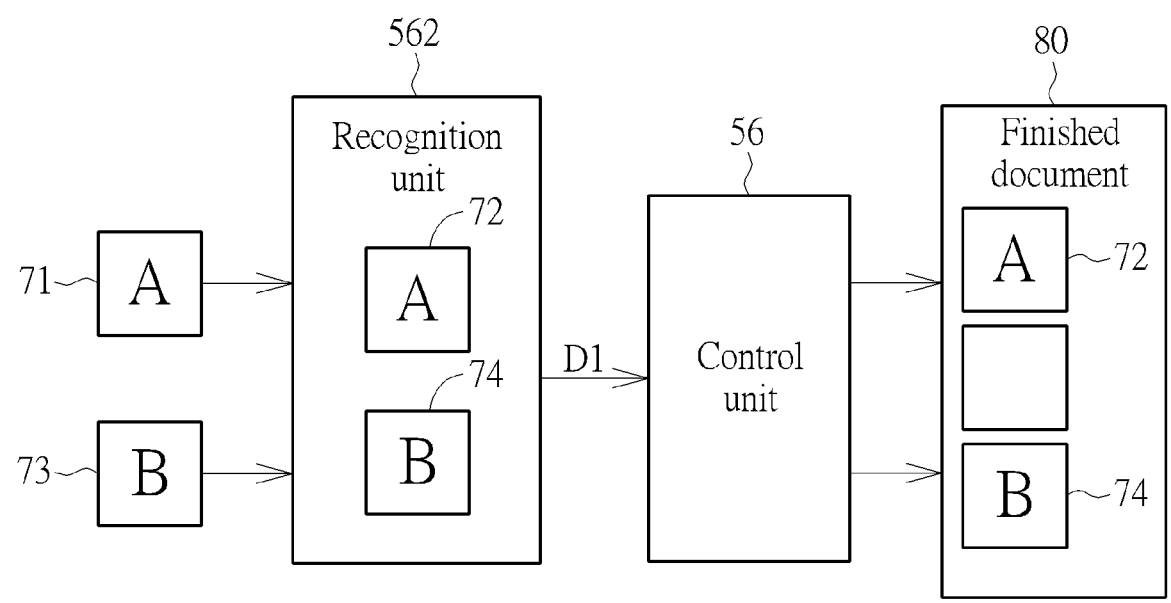
FIG. 5 is a functional block diagram of image recognition and processing in a first status according to the embodiment of the present invention.

Please refer to FIG. 3 to FIG. 5. FIG. 5 is a functional block diagram of image recognition and processing in a first status according to the embodiment of the present invention. In step 106, the scanning module 52 scans a first scanned page 71 to generate a first image 72 of the first scanned page 71. After finishing scanning the first scanned page 71, the object 4 is rotated 180 degrees so as to place a second scanned page 73 on the scanning area 5021. The above-mentioned steps are repeated for scanning the second scanned page 73 so as to generate a second image 74 of the second scanned page 73, and then execute step 108.

Figure 6:
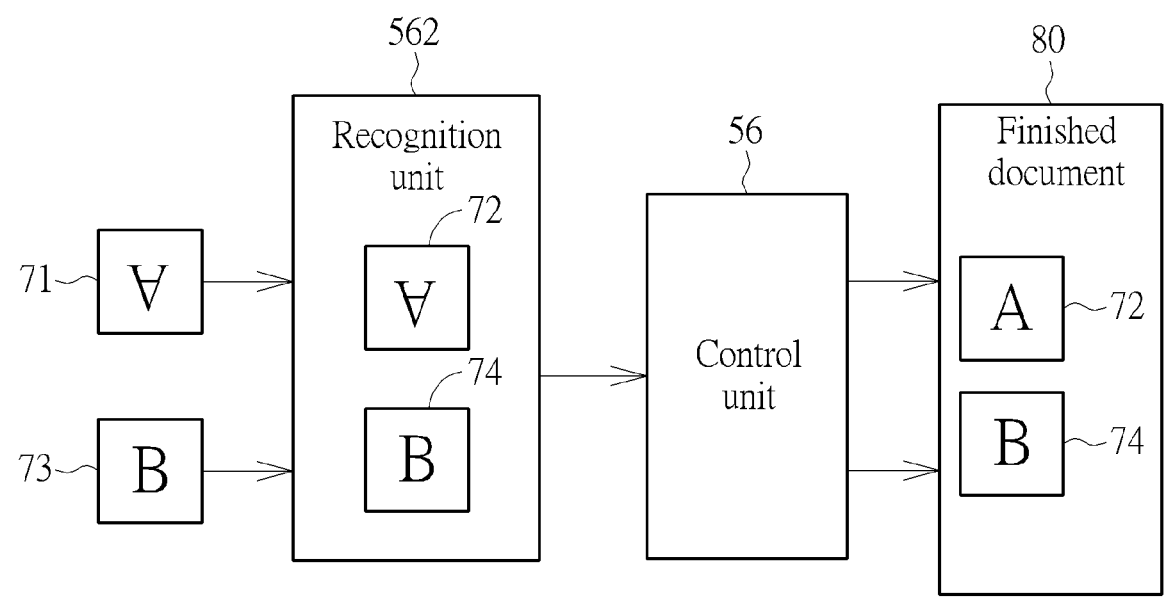
FIG. 6 is a functional block diagram of image recognition and processing in a second status according to the embodiment of the present invention.

Please refer to FIG. 4 to FIG. 6. FIG. 6 is a functional block diagram of image recognition and processing in a second status according to the embodiment of the present invention. In step 108, the control unit 56 receives the first image 72 and the second image 74, and the recognition unit 562 recognizes whether the first image 72 along with the second image 74 are continuous. The recognition unit 562 can be an orientation recognition unit or a page number recognition unit. The recognition unit 562 recognizes whether the first image 72 along with the second image 74 are continuous according to the orientation or the page numbers of the first image 72 and the second image 74. The recognition unit 562 optionally generates and sends a status signal D1 to the control unit 56. For example, as the first image 72 is aligned in orientation with the second image 74, the recognition unit 562 recognizes the first image 72 and the second image 74 are discontinuous and sends the status signal D1 to the control unit 56.

In step 110, the control unit 56 follows different procedures according to whether the control unit 56 receives the status signal D1 or not. For example, in the first status as shown in FIG. 5, as the control unit 56 has received the status signal D1, the control unit 56 then generates an insertion image 76 between the first image 72 and the second image 74. In the second status as shown in FIG. 6, when the control unit 56 fails to receive the status signal D1, the control unit 56 will not generate the insertion image 76 between the first image 72 and the second image 74. In this embedment, the insertion image 76 is a blank image. The insertion image 76 can also be a well-designed page in another embodiment. Additionally, as the first image 72 and the second image 74 are indifferent orientations, the control unit 56 adjusts the first image 72 or the second image 74 so as to align the first image 72 in orientation with the second image 74. As shown in FIG. 6, the recognition unit 562 recognizes the first image 72 to be upside down so that the control unit 56 rotates the first image 72 for 180 degrees. Not limited to this, according to another embodiment, when the first and second scanned pages 71, 73 are originally placed and scanned to generate the first image 72 and the second image 74 having misplaced orientation with each other in a way from upside down, say, 90 degrees apart from each other, the control unit 56 is still able to adjust the orientation of the first image 72 or the second image 74 so as to align the first image 72 in orientation with the second image 74.

The recognition and determination procedures regarding the first image 72 and the second image 74 provided above are applicable on any two serially scanned pages of a plurality of pages of the object 4. The orientation of each of the former scanned page (the first scanned page 71) and the later scanned page (the second page 73) can be determined by step 106 to step 108. Each the former scanned page can be adjusted to align in orientation with the later scanned page automatically, and the control unit 56 performs appropriate procedures to make discontinuous pages distinguishable, facilitating a user with easy preview, read, and output.

Finally, in step 112, a finished document 80, including all images processed by the above steps such as the first image 72, the second image 74 and the insertion image 76 . . . etc., is outputted by the output module 58. These images will be shown in correct orientation, with blank images between discontinuous pages that makes previewing and reading a lot easier.

According to the embodiments of the invention, the control unit determines whether the scanning apparatus enters the book scanning mode according to the existence of the detection signal sent by the sensor when scanning the object. The recognition unit then recognizes whether the images scanned under the book scanning mode are continuous. The control unit automatically inserts the blank image when the scanned images are discontinuous. Additionally, all pages of the finished document will be aligned in orientation after the adjustment made by the control unit, and the inserted blank image will serve a role to correctly position the pages of the finished document at the left/right sides, so that reading of the finished document may be easier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scanning apparatus for scanning an object, comprising:
    a casing, comprising a first flatbed and a second flatbed, the first flatbed being for placing the object and comprising a scanning area, and the second flatbed adjacent to the first flatbed;
    a scanning module, disposed in the casing and under the first flatbed for capturing the object on the scanning area so as to generate a first image from a first scanned page and a second image from a second scanned page;
    at least one sensor, disposed in the casing for sensing the object so as to send a detection signal; and
    a control unit, electrically connected to the scanning module and the sensor for actuating the scanning module to scan and generate the first image and the second image when the control unit receives the detection signal;
    wherein the control unit further comprises a recognition unit for recognizing whether the first image along with the second image are continuous according to the orientation of the first image and the second image, as the first image and the second image are in a same orientation and recognized by the recognition unit to be discontinuous, the control unit generates an insertion image between the first image and the second image.

2. The scanning apparatus of claim 1, wherein the object comprises a ready page to be scanned, and the first flatbed is for placing the ready page.

3. The scanning apparatus of claim 2, wherein the sensor is disposed on the second flatbed and the object further comprises an unready page disposed on the second flatbed and utilized for triggering the sensor, so that the sensor sends the detection signal to the control unit so as to control the scanning apparatus to enter a book scanning mode, and the object is a book.

4. The scanning apparatus of claim 1, wherein the control unit is utilized for adjusting the first image or the second image so as to align the first image in orientation with the second image when the recognition unit recognizes the first image and the second image are different in orientation.

5. The scanning apparatus of claim 1, wherein the recognition unit recognizes whether the first image along with the second image are continuous according to page numbers of the first image and the second image.

6. The scanning apparatus of claim 1, wherein the insertion image is a blank image.

7. The scanning apparatus of claim 1, further comprising an output module for outputting a finished document, the finished document comprising the first image, the second image, and the insertion image.

8. The scanning apparatus of claim 1, wherein the sensor is disposed at a position of the second flatbed close to the first flatbed and the sensor is a mechanical sensor or an optical sensor.

9. The scanning apparatus of claim 1, wherein an angle is formed between the first flatbed and the second flatbed, and the angle ranges from 90 to 180 degrees.

* * * * *